United States Patent [19]

Harada et al.

[11] Patent Number: 6,107,994
[45] Date of Patent: *Aug. 22, 2000

[54] CHARACTER INPUT METHOD AND APPARATUS ARRANGEMENT

[75] Inventors: Takashi Harada, Yokohama; Katsuhiko Sakaguchi, Kawasaki; Shigeki Mori, Koshigaya; Kazuhiro Matsubayashi, Yokohama; Tsunekazu Arai, Tokyo; Eiji Takasu, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,421

[22] Filed: Sep. 26, 1997

Related U.S. Application Data

[63] Continuation-in-part of application No. 08/520,732, Aug. 29, 1995, abandoned, which is a continuation of application No. 08/160,858, Dec. 3, 1993, abandoned.

[30] Foreign Application Priority Data

Dec. 24, 1992 [JP] Japan ................................. 4-344100

[51] Int. Cl.$^7$ ........................................................ G09G 5/00
[52] U.S. Cl. ................................................. 345/168; 345/173
[58] Field of Search .................................... 345/173, 179, 345/180, 182, 172, 169, 156, 157, 159, 358, 168, 902, 901; 178/18, 19; 341/22, 23

[56] References Cited

U.S. PATENT DOCUMENTS

| | | | |
|---|---|---|---|
| 4,333,097 | 6/1982 | Buric et al. | 345/168 |
| 4,725,694 | 2/1988 | Auer et al. | 178/18 |
| 5,218,538 | 6/1993 | Zhang | 341/22 |
| 5,457,454 | 10/1995 | Sugano | 345/179 |
| 5,603,053 | 2/1997 | Gough et al. | 345/179 |
| 5,677,710 | 10/1997 | Thompson-Rohrlich | 345/173 |

FOREIGN PATENT DOCUMENTS

| | | | |
|---|---|---|---|
| 0156129 | 8/1985 | Japan | 341/22 |
| 3062216 | 3/1991 | Japan . | |
| WO9209038 | 5/1992 | WIPO . | |

OTHER PUBLICATIONS

An X-ray Browse Function for Identifying Keyboard Definition, Research Disclosure, Apr. 1991, No. 324.

*Primary Examiner*—Chanh Nguyen
*Attorney, Agent, or Firm*—Fitzpatrick, Cella, Harper & Scinto

[57] ABSTRACT

In a character input method and apparatus, data can be input by a simple operation using a displayed keyboard. The keyboard is displayed on the picture surface of a display unit, and data is input by designating a key position on the keyboard. The designated key position is detected based on a designated coordinate position on the keyboard. The corresponding operation is identified based on coordinate positions subsequently input on the keyboard, and a specific key code is generated based on the detected key position and the identified operation.

30 Claims, 5 Drawing Sheets

CHARACTER INPUT METHOD AND APPARATUS ARRANGEMENT

This application is a continuation of application Ser. No. 08/520,732 filed Aug. 29, 1995, now abandoned which was a continuation of application Ser. No. 08/160,858 filed Dec. 3, 1993, now abandoned.

BACKGROUND OF THE INVENTION

1. Field of the Invention

This invention relates to a character input method and apparatus in which arbitrary coordinate data can be input on a displayed keyboard, and a desired character can be input from the correspondence between the input coordinate data and each key of the displayed keyboard.

2. Description of the Related Art

Key input apparatuses, computer apparatuses or the like have been known in which a keyboard (soft keyboard) is displayed on the picture surface of the apparatus, and an input operation is performed by designating a key position on the displayed keyboard using a pointing device or the like. In general, when performing an input operation using an ordinary keyboard, in order to input a desired character by combining a special key, such as a shift key, a control key, an alternate key or the like, with an ordinary character key, both keys must be simultaneously depressed. On the other hand, when performing a key input operation using a displayed soft keyboard, it is impossible to simultaneously depress two keys by a single pointing device. Accordingly, the above-described key input operation of combining a character key with a special key is performed by first selecting the special key by an operation, such as clicking, tapping or the like, of a mouse or the like, and then selecting the character key by the same operation. In this case, the operation mode of the selected special key is locked until another special key is selected, or the selected state is held until the same key is depressed again.

Accordingly, in the above-described conventional approach, when performing an input operation of only an ordinary character key immediately after a key input operation of a special key has been performed, the character key must be input after releasing the operation mode of the selected special key. Consider, for example, the case of inputting an English sentence "I am a Japanese." First, before inputting character "I", a shift mode is provided by designating a shift key, and then character key "i" is designated. Thereafter, the shift key is designated again to release the shift mode, and then the lower-case-letter string "am a" is input. Thereafter, the shift mode is provided again by designating the shift key, and then character key "j" is designated to input upper-case letter "J." Then, the shift mode is released by designating the shift key, and the remaining lower-case-letter string "apanese" must be input. As described above, the conventional approach has the disadvantage that the shift mode must be set and released every time an upper-case letter is input. The same kind of operation must also be performed when a control key or an alternate key is used.

SUMMARY OF THE INVENTION

The present invention has been made in consideration of the above-described problems.

It is an object of the present invention to provide a character input method and apparatus, in which by performing a coordinate input operation on a displayed keyboard, it becomes unnecessary to designate a plurality of keys when inputting a desired character, and therefore a character can be input by a simple operation.

According to one aspect, the present invention which achieves this object relates to a character input apparatus for displaying a keyboard on a display picture surface and for inputting data by designating a key position on the keyboard. The apparatus comprises detection means for detecting a designated key position based on a designated coordinate position on the displayed keyboard, identification means for identifying a corresponding operation based on coordinate positions subsequently input on the displayed keyboard, and key-code generation means for generating a specific key code based on the key position detected by the detection means and the operation identified by the identification means.

According to another aspect, the present invention which achieves this object relates to a key input method for displaying a keyboard on a display picture surface and for inputting data by designating a key position on the keyboard. The method includes the steps of inputting a designated coordinate position on the keyboard and detecting the designated key position based on the coordinate position, identifying a corresponding operation based on coordinate positions input after the designation of the key position on the keyboard, and generating a specific key code based on the detected key position and the identified operation.

In the above-described configuration, the designated coordinate position on the keyboard is input, and the designated key position is detected based on the coordinate position. The corresponding operation is identified based on the coordinate positions input after the designation of the key position on the keyboard, and the specific key code is generated based on the detected key position and the identified operation.

According to another aspect of the invention, a character input apparatus comprises coordinate information input means for inputting coordinate information, storage means for storing character information together with coordinate information corresponding thereto, and character information extraction means for comparing coordinate information input to the storage means with the stored coordinate information to identify coordinate information including the input coordinate information, and for extracting stored character information corresponding to the coordinate information. In addition, function determination means recognizes the coordinate information input by the coordinate information input means and determines a function indicated by the input coordinate information, and character code determination means determines one character code from the function determined by the function determination means and the character information extracted by the character information extraction means.

In accordance with another aspect of the invention, a character input method comprises the steps of inputting coordinate information, comparing the input coordinate information with coordinate information stored in advance so as to correspond to character information to identify coordinate information including the input coordinate information, and extracting stored character information corresponding to the coordinate information. In addition, the input coordinate information is recognized and a function indicated by the coordinate information is determined, and one character code from the determined function and the extracted character information is determined.

These and other objects, advantages and features of the present invention will become more apparent from the following description of the preferred embodiments taken in conjunction with the accompanying drawings.

DESCRIPTION OF THE PREFERRED EMBODIMENTS

Preferred embodiments of the present invention will now be described in detail with reference to the drawings.

Figure 1:
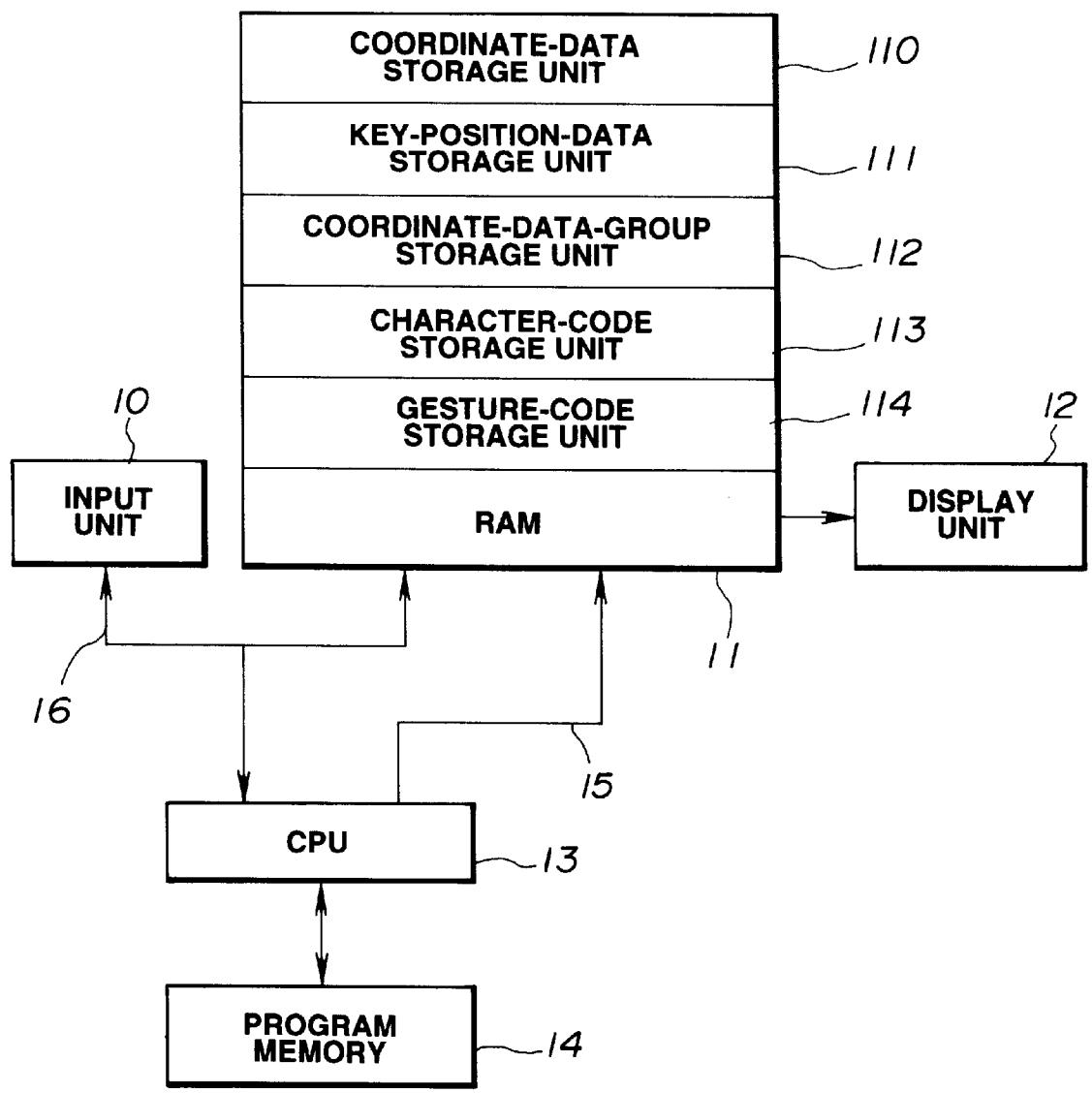
FIG. 1 is a block diagram illustrating the configuration of an apparatus according to an embodiment of the present invention.

FIG. 1 is a block diagram illustrating the schematic configuration of a computer apparatus according to an embodiment of the present invention. Each of the elements shown in block outline in FIG. 1 is well known per se, and a specific type of construction is not critical to carrying out the invention or to a disclosure of the best mode for carrying out the invention.

In FIG. 1, input unit 10 includes an input pen or a pointing device, such as a mouse or the like. When a position has been designated on the picture surface of display unit 12 by the pointing device, coordinate data corresponding to the designated position is output to CPU (central processing unit) 13. RAM 11 is used as work areas for CPU 13, and stores a gesture dictionary which stores characteristic data of each pattern, such as a gesture or the like, used for recognition of a pattern input to input unit 10, and codes corresponding to respective gestures. RAM 11 also stores various kinds of data storage units, such as coordinate-data storage unit 110 for storing designated coordinate data on the picture surface input from input unit 10, key-position-data storage unit 111 for storing a display pattern, character codes corresponding to respective keys of a soft keyboard (to be described later), and coordinate data of respective positions displayed on the key display unit, and the like. Display unit 12, comprising a liquid-crystal display, a CRT or the like, displays various kinds of data, and also displays a keyboard (soft keyboard) on its picture surface. By designating a key position through input unit 10, CPU 13 determines the corresponding key by comparing input coordinate data with coordinate data stored in key-position-data storage unit 111. Thus, various kinds of data can be input. CPU 13 controls the entire apparatus, and performs controls, which will be described later, in accordance with control programs (refer to flowcharts which will be described later) stored in program memory 14. Address bus 15 is used for accessing data of RAM 11 from CPU 13. Data bus 16 is used for input/output of data for addresses of RAM 11 assigned through address bus 15, and for reading data from input unit 10.

Figure 2:
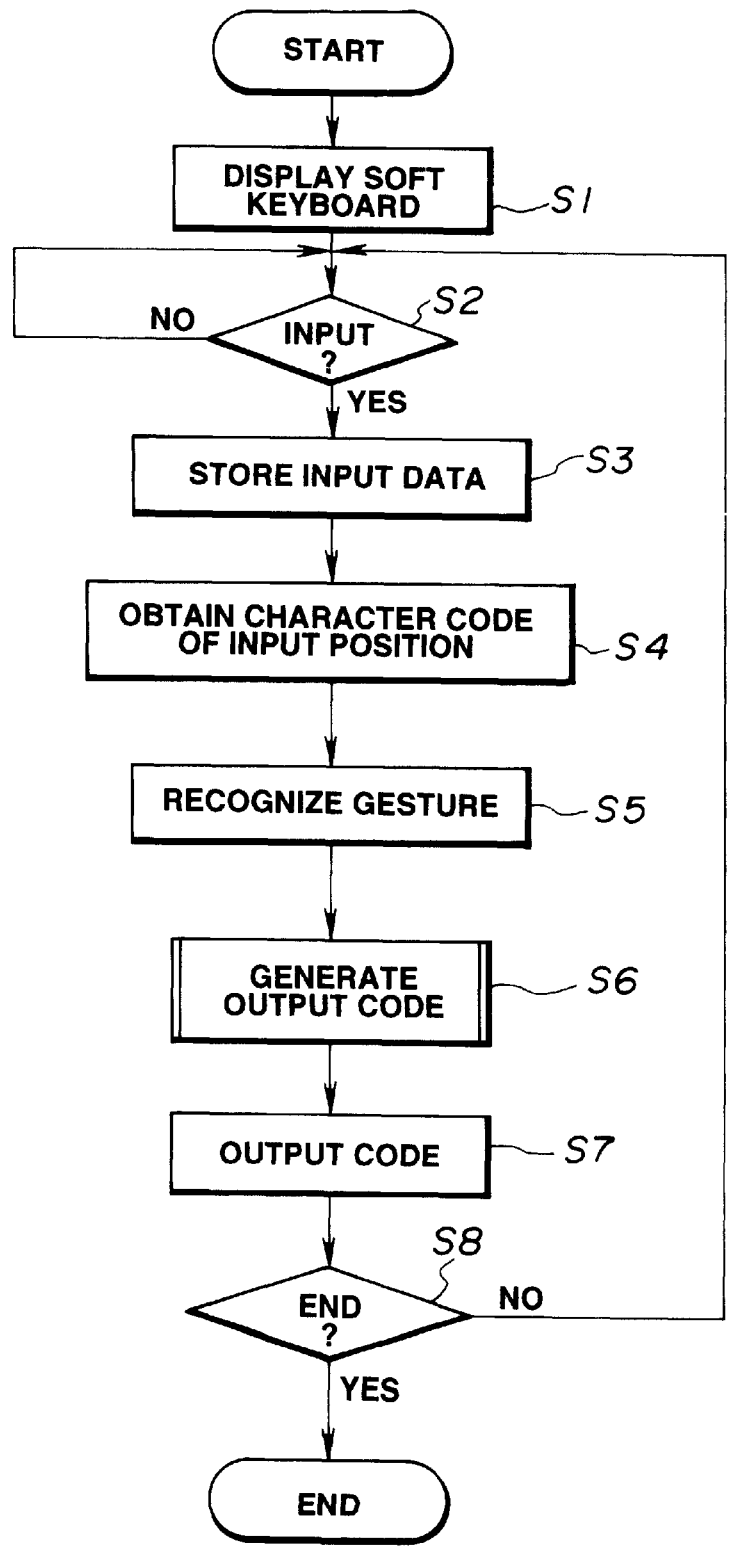
FIG. 2 is a flowchart illustrating the entire character input processing.

Next, a description will be provided of the control operation by CPU 13 of the computer apparatus with reference to the flowchart shown in FIG. 2.

Figure 3:
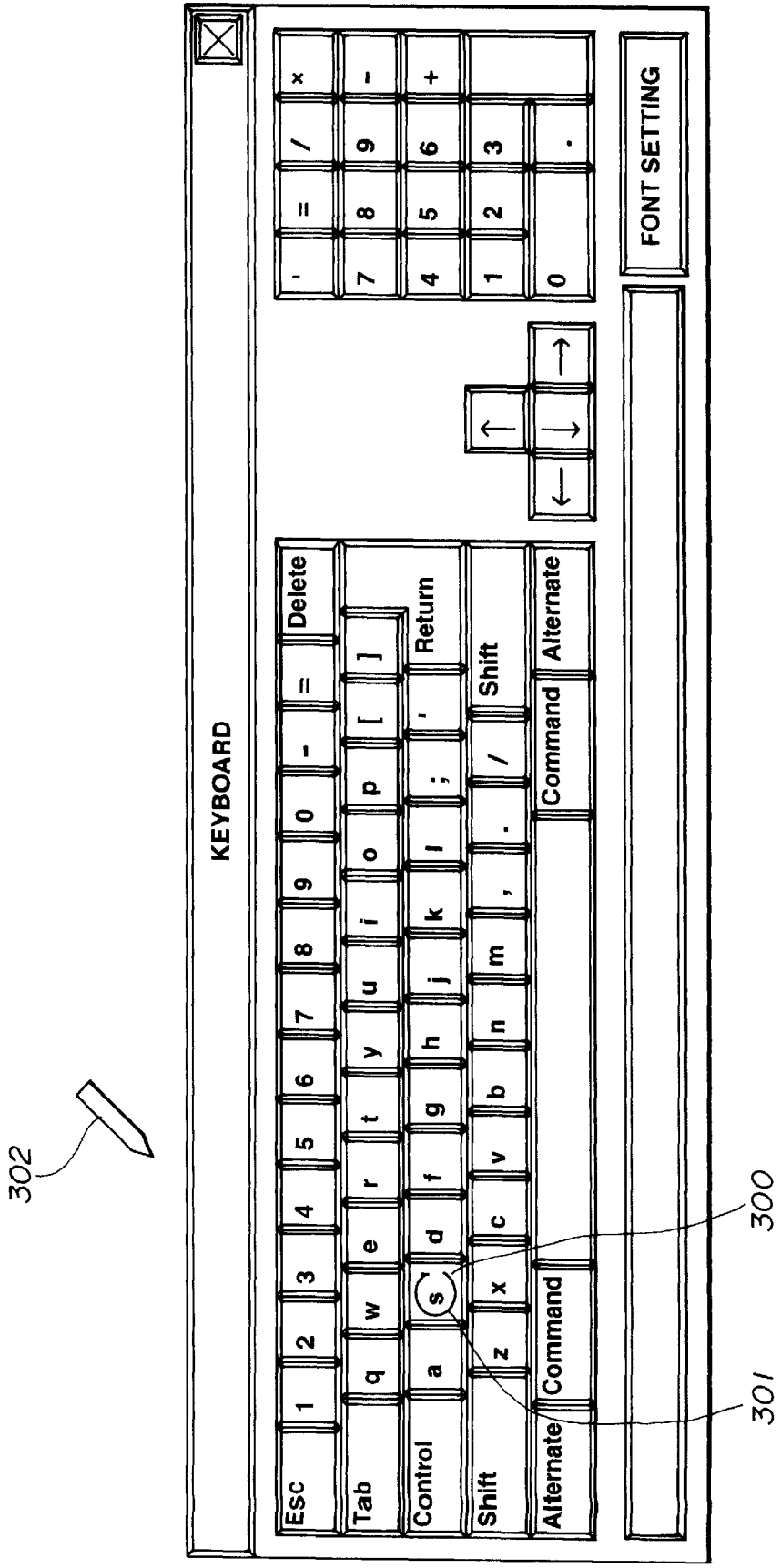
FIG. 3 is a diagram illustrating a soft keyboard and a character input operation.

First, in step S1, a soft keyboard as shown in FIG. 3 is displayed on display unit 12 by displaying the display pattern stored in key-position-data storage unit 111. At that time, the display position of each key of the soft keyboard displayed on display unit 12 conforms to coordinate data stored in key-position-data storage unit 111 of RAM 11. The process then proceeds to step S2, where a position on the picture surface of display unit 12 awaits designation by the pointing device of input unit 10. When a position has been designated and coordinate data of that position has been input, the process proceeds to step S3. In step S3, the input coordinate data on the picture surface of display unit 12 is read from input unit 10 via data bus 16, and the read coordinate data is written in coordinate-data storage unit 110 of RAM 11. At that time, the input of a gesture is determined based on determining conditions, such as if the positions of coordinate data input from input unit 10 are consecutive, and if the coordinate data have been input within a predetermined time period. A group of thus input gesture data is stored in coordinate-data-group storage unit 112 of RAM 11 as a coordinate-data group.

The process then proceeds to step S4. In step S4, the coordinate-data group stored in coordinate-data-group storage unit 112 in step S3 is compared with coordinate data indicating the display region of each key of the keyboard stored in key-position-data storage unit 111 used when the soft keyboard has been displayed in step S1. By identifying the key having the display region corresponding to coordinate data containing the coordinate-data group stored in step S3, CPU 13 determines on which display region corresponding to the identified key of the soft keyboard displayed on display unit 12 the operator has input data by operating the pointing device of input unit 10, and stores the character code stored in key-position-data storage unit 111 corresponding to the key in character-code storage unit 113. As will be described later, in the present embodiment, the operator not only designates a key position on the displayed keyboard, but may also depict the pattern of a character or the like on the key using the pointing device of input unit 10.

The process then proceeds to step S5. In step S5, by analyzing characteristics of the coordinate-data group stored in step S3, comparing the characteristics with the gesture dictionary stored in RAM 11 and determining the gesture which coincides with the characteristics, the contents (the kind of gesture) designated by the coordinate-data group are determined, and the code corresponding to that gesture is generated. For example, when it has been determined that the input coordinate-data group represents the character patterns of character "C" (corresponding to the control-key input), character "S" (corresponding to the shift-key input), character "A" (corresponding to the alternate-key input), and other patterns (including tapping) codes "1", "2", "3" and "4" are generated, respectively, and the values of the respective codes are stored in gesture-code storage unit 114 of RAM 11. A code recognized by this gesture recognition processing and extracted from the gesture dictionary within RAM 11 will be hereinafter termed a "gesture code."

The process then proceeds to step S6. In step S6, the output code corresponding to the operation from input unit 10 is generated based on the character code obtained in step S4 and stored in character-code storage unit 113 and the gesture code determined in step S5 and stored in gesture-code storage unit 114.

Next, a description will be provided of the procedure of generating an output code when ASCII codes are used as the code system. Of course, other code systems may be used without departing from the scope of the invention. Consider, for example, a case in which as shown in FIG. 3, character "C" 301 is depicted on character "s" 300 on the soft keyboard displayed on display unit 12 using the pointing device of input unit 10. In this case, in step S4, character code "73H (H represents a hexadecimal number)" for the designated character "s" is obtained. Next, in step S5, gesture code "1" is obtained since character "C" is depicted on the key "s." In FIG. 3, reference numeral 302 represents a displayed cursor.

Figure 4:
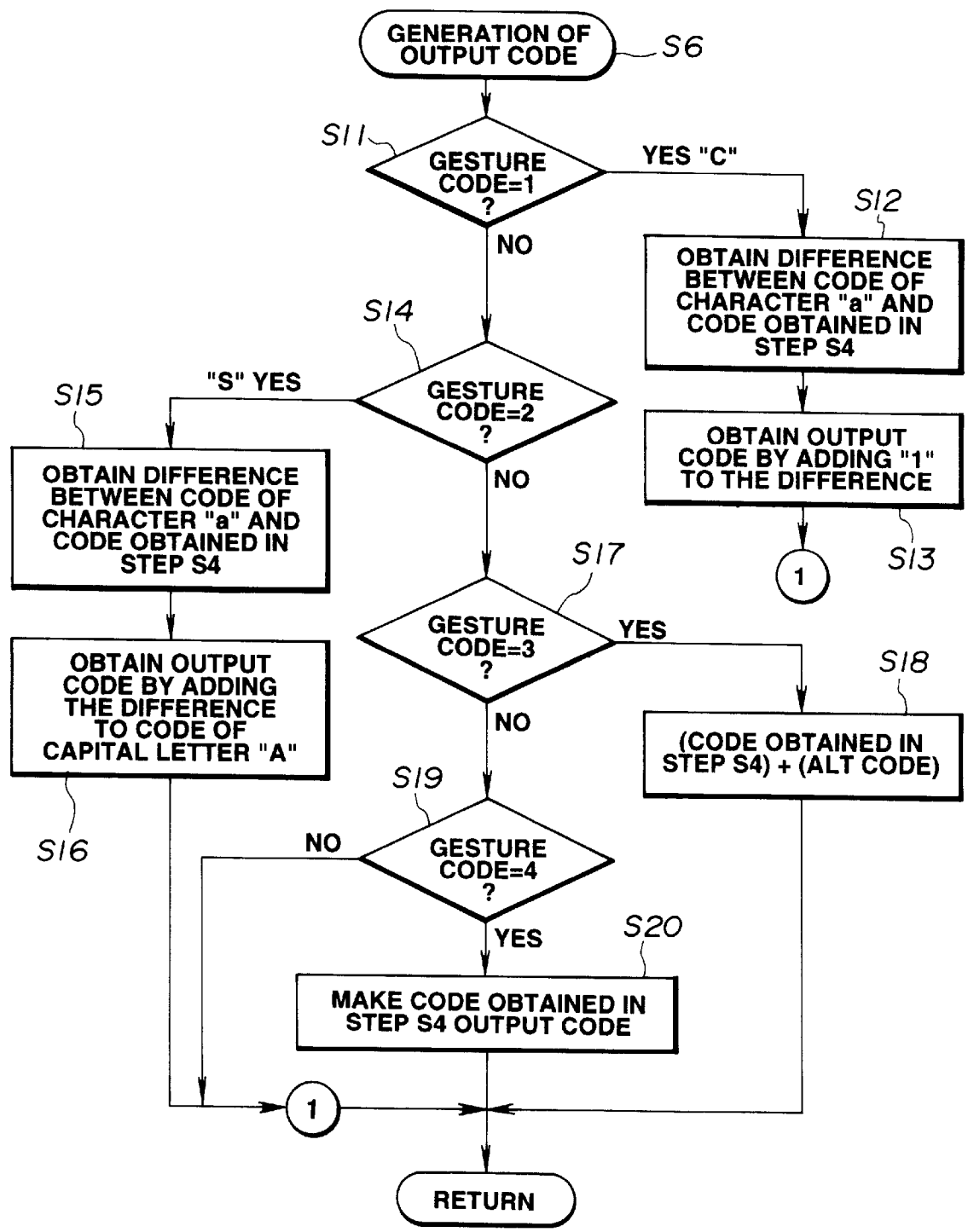
FIG. 4 is a flowchart illustrating output-code generation processing.

FIG. 4 is a flowchart illustrating the details of the processing of generating an output code in step S6 in the ASCII code system. The processing of the present embodiment will be described with reference to this flowchart.

In the ASCII code system, "@" of "control" code is allocated to "0", and respective alphabetical characters are allocated to numerals in the alphabetical order, such as "a" to "1", and "b" to "2". Lower-case-letter character codes of the alphabet are allocated in the alphabetical order from "97=61H" for character "a." Accordingly, first, in step S11, it is determined whether or not the gesture code equals "1." If the result of the determination is affirmative, the process proceeds to step S12, where the difference "115−97=18" between character "s" and character "a" is calculated. The process then proceeds to step S13, where code "1" is obtained as the base of the control code from the gesture code "1", and code "19" is obtained as the output code by adding these two values. Thus, the same key code as that when the control key and character "s" are simultaneously depressed is obtained.

If the result of the determination in step S11 is negative, the process proceeds to step S14, where it is determined whether or not the gesture code equals "2". If the result of the determination is affirmative, the process proceeds to step S15, where the difference between the code for character "a" and the code obtained in step S4 is obtained. In step S16, the obtained code difference is added to the code for upper-case letter "A" to obtain the character code of the corresponding upper-case letter. That is, if, for example, character "S" is depicted on key "f" on the soft keyboard displayed on display unit 12, character code "102=66H" for key "f" is obtained in step S4. Then, in step S5, code "2" corresponding to character "S" is obtained as the gesture code. In the ASCII code system, the character code for upper-case letter "A" equals "65=41H", and the subsequent codes are allocated for alphabetical letters in the alphabetical order until letter "Z". Accordingly, in step S15, the code difference "102−97=5" between character "f" and character "a" is calculated. The process then proceeds to step S16, where the base "65" for the uppercase-letter character code is obtained from the gesture code "2", and code "70" (the code for upper-case letter "F") is obtained as the output code by adding these two values.

If the result of the determination in step S14 is negative, the process proceeds to step S17, where it is determined whether or not the gesture code equals "3." If the result of the determination is affirmative, the process proceeds to step S18, where the sum of the key code obtained in step S4 and the alternate-key code is determined as the output code. If the gesture code equals "4", the process proceeds from step S19 to step S20, where the character code obtained in step S4 (the character code corresponding to the designated key) is made to be the output code, and the process is terminated.

After thus determining the output code, the process proceeds to step S7, where the determined code is output to a character-pattern generation unit (not shown). The process then proceeds to step S8, where it is determined whether or not the code input to input unit 10 is an end code. If the result of the determination is affirmative, the process is terminated. If the result of the determination is negative, the process returns to step S2, where the subsequent input is awaited.

By performing the above-described procedure, in contrast to the conventional input operation using a special key and an ordinary character key which requires two operations consisting of first selecting the special key, for example, by tapping it, and then selecting the ordinary character key, for example, by tapping it, an input operation using a plurality of keys can be performed by only depicting a character on a displayed key. It is thereby possible to reduce the number of key input operations and the time of operations.

Although in the above-described embodiment, a description has been provided of the case in which an input operation is performed by depicting a character on an ordinary character key, the present invention is not limited to such an approach. For example, an alphabetical letter or the like may be depicted on any of the special keys, such as the shift key, the control key and the like.

Figure 5:
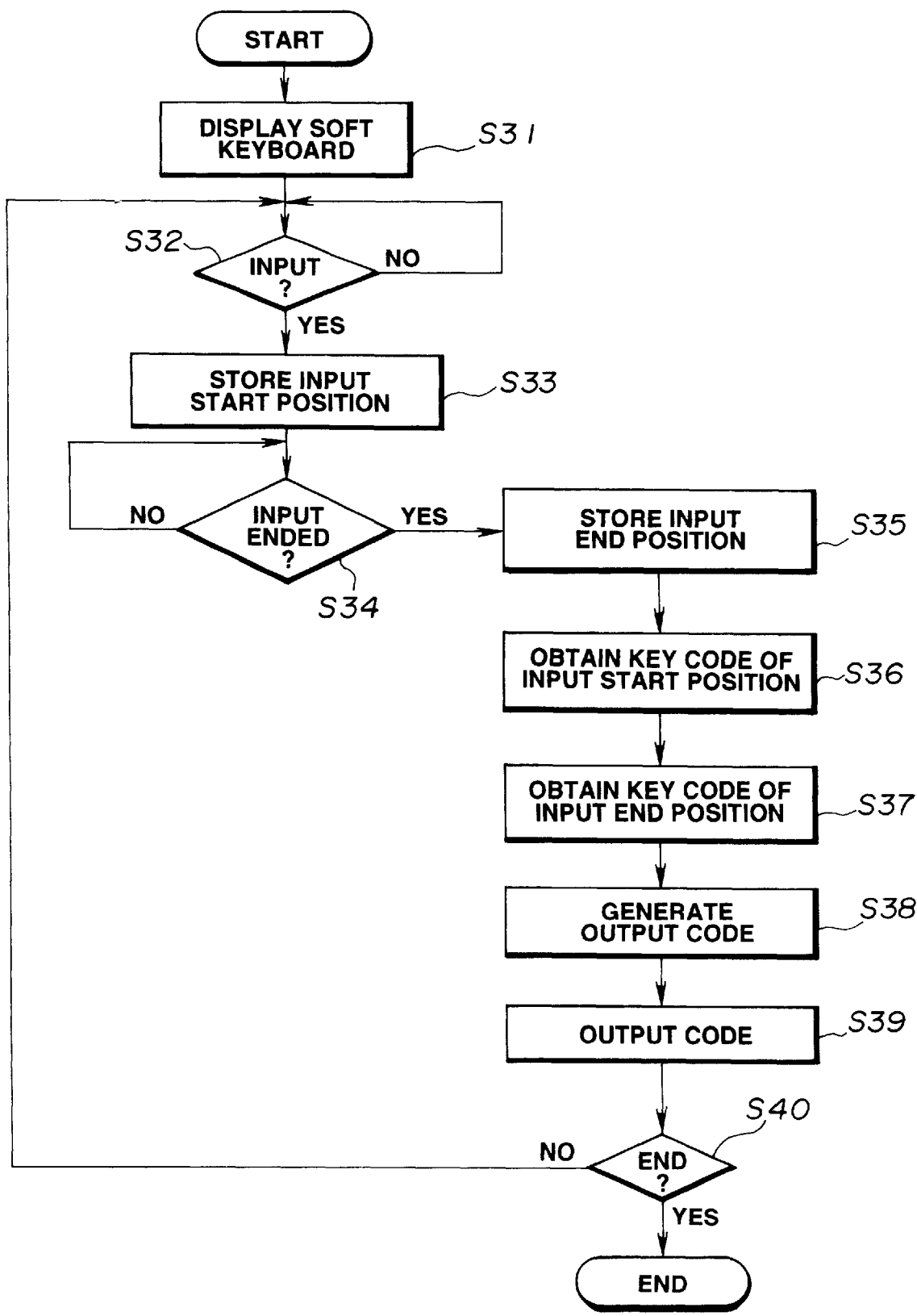
FIG. 5 is a flowchart illustrating character input processing by a dragging operation.

Next, a description will be provided of a second embodiment of the present invention with reference to the flowchart shown in FIG. 5. In the second embodiment, by utilizing a dragging operation by the input pen or the pointing device, such as a mouse or the like, of input unit 10, in which a designated position is moved while depressing the button of the pen or the pointing device, one character code is obtained from key codes for two keys on the soft keyboard corresponding to the point where the dragging operation is started and at the point where the dragging operation is terminated.

First, in step S31, the soft keyboard is displayed on display unit 12 in the same manner as in step S1. The process then proceeds to step S32, where an input from input unit 10 is awaited as in step S2. When there has been an input, the position designated by the input on display unit 12 is input from input unit 10 via data bus 16. In step S33, coordinate data of the point where the input has been started is stored in coordinate-data storage unit 110. CPU 13 monitors if the positions of input coordinate data are consecutive based on positional data transmitted from input unit 10. The process then proceeds to step S34, where it is determined whether or not the input processing in input unit 10 has been completed. If the result of the determination is affirmative, the process proceeds to step S35, where coordinate data of the point where the input has been terminated is stored in coordinate-data-group storage unit 112.

The process then proceeds to step S36. As in step S4, in step S36, by comparing coordinate values of coordinate-data storage unit 110 and coordinate-data-group storage unit 112 stored in RAM 11 in steps S33 and S35 with key-position data 111 of respective keys used when the soft keyboard has been displayed in step S31, it is detected from which key of the soft keyboard the operator has started the dragging operation, and on which key the operator has terminated the dragging operation. If the detected key code represents a character, it is stored in character-code storage unit 112 of RAM 11. If the detected key code represents a special key, such as the control key, the shift key, the alternate key or the like, the same code as the above-described gesture code is generated and stored in gesture-code storage unit 114.

The process then proceeds to step S38. In step S38, the output code is generated in the same manner as in step S6 based on data of character-code storage unit 113 and gesture-code storage unit 114 in which the key codes corresponding to the key display at the input start position (the dragging-operation start position) and at the input end position (the dragging-operation end position) are stored. In step S39, the generated code is output to a character-pattern generation unit (not shown). The process then proceeds to step S40, where it is determined whether or not the code input from input unit 10 is an end code. If the result of the determination is affirmative, the process is terminated. If the result of the determination is negative, the subsequent input is awaited. In the present embodiment, a special key may be designated when starting an input operation, and an ordinary key may be designated when terminating the input operation, or vice versa.

By executing the above-described procedure, one code can be synthesized from respective key codes for the point where the dragging operation has been started and the point where the dragging operation has been terminated. For example, if the input pen is pressed against the "r" key and dragged across the soft keyboard until it reaches the "shift" key, the key code "R" is obtained. Accordingly, as in the above-described embodiment, in contrast to the conventional input operation using a special key and an ordinary character key which requires two operations consisting of first selecting the special key, for example, by tapping it, and then selecting the ordinary character key, for example, by tapping it, one key input operation can be performed by a single stroke operation consisting of a dragging operation between the special key and the ordinary key. It is thereby possible to reduce the time of operations.

The present invention may be applied to a system comprising a plurality of apparatuses, or to an apparatus comprising a single unit. The present invention may, of course, be applied to a case in which the invention can be achieved by supplying a system or an apparatus with operation programs.

In the above-described embodiments, a printed keyboard for character input may, of course, be used, provided that a coordinate input can be performed on that keyboard.

As described above, according to the present embodiments, data can be input by designating a combination of "a special key and an ordinary character key" by depicting a character on a displayed key or by a single dragging operation. Hence, the time of input operations can be reduced.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A character input apparatus for a keyboard on which a key picture surface is displayed, said apparatus comprising:
   detection means for detecting a designated key position based on input coordinates where a designated character key pattern is depicted on a displayed keyboard;
   identification means for recognizing an input pattern which is superimposed on said designated key pattern depicted in the detected key position on said displayed keyboard and for identifying a pattern having a similar shape to said input pattern from among a plurality of predetermined patterns having different shapes, respectively;
   code generation means for generating a specific code based on the designated key position detected by said detection means and the input pattern identified by said identification means; and
   input means for inputting a pattern constituted by said specific code at a plurality of coordinates corresponding to those input on the display keyboard.

2. A character input apparatus according to claim 1, wherein said identification means identifies a character depicted on the key position detected by said detection means.

3. A character input apparatus according to claim 1, wherein said identification means identifies a continuous designating input operation started from a designated key position detected by said detection means, and identifies a key position where the continuous operation is terminated.

4. A character input apparatus according to claim 1, wherein the key position is designated using a pen input device.

5. A character input apparatus according to claim 1, wherein the key position is designated using a pointing device.

6. A character input apparatus according to claim 1, further comprising storage means for storing display information relating to the displayed keyboard on the display picture surface.

7. A character input apparatus according to claim 1, wherein said detection means detects both a designated key position based on the designated coordinate position and a pattern input at the designated coordinate position.

8. A character input apparatus according to claim 1, wherein said identification means includes a gesture code storage unit for storing characteristic data of a plurality of input patterns.

9. A character input method for a keyboard on which a key picture surface is displayed,
   said method comprising the steps of:
      detecting a designated key position based on input coordinates where a designated character key pattern is depicted on a displayed keyboard;
      recognizing an input pattern which is superimposed on said designated key pattern depicted in the detected key position on said displayed keyboard and identifying a pattern having a similar share to said input pattern from among a plurality of predetermined patterns having different shapes, respectively;
      generating a specific code based on the detected designated key position and the identified input pattern; and
      inputting a pattern constituted by said specific code at a plurality of coordinates corresponding to those input on the display keyboard.

10. A character input method according to claim 9, wherein said identifying step identifies a character depicted on the detected key position.

11. A character input method according to claim 9, wherein said identifying step identifies a continuous designating input operation started from the detected key position, and identifies a key position where the continuous operation is terminated.

12. A character input method according to claim 9, wherein the key position is designated using data input from a pen input device.

13. A character input method according to claim 9, wherein the key position is designated using data input from a pointing device.

14. A character input method according to claim 9, further comprising the step of providing storage means for storing display information relating to the keyboard, and wherein the keyboard displayed on the display picture surface is displayed according to the stored display information.

15. A character input apparatus, comprising:

coordinate information input means for inputting coordinate information on a keyboard displayed on a picture surface, with the coordinate information being a continuous single input of information including a start position at a first key and an end position at a second key on the displayed keyboard;

storage means for storing key codes together with coordinate information corresponding thereto;

key code determination means for comparing the coordinate information input by said coordinate information input means with the stored coordinate information to identify coordinate information including the input coordinate information and for determining a key code indicated by the input coordinate information; and character code determination means for determining one character code from the determined two key codes indicated by the start position and end position of a continuous single input.

16. A character input apparatus according to claim 15, wherein said coordinate information input means uses a pen input device.

17. A character input apparatus according to claim 15, wherein said coordinate information input means comprises a pointing device.

18. A character input apparatus according to claim 15, further comprising display means for displaying a character pattern specified by the stored character information corresponding to the coordinate information at a position on said display means specified by coordinate information stored in said storage means.

19. An apparatus according to claim 15, wherein one of said two key codes for determining character code indicates a function and the other indicates a character.

20. A character input apparatus according to claim 15, wherein said coordinate information input means inputs both a designated key position and a start position of the continuous single input of information at the first key.

21. A character input method, comprising the steps of:

inputting coordinate information on a keyboard displayed on a picture surface, the coordinate information being input in a single continuous operation and including a start position at a first key and an end position at a second key on the keyboard;

storing key codes together with coordinate information corresponding thereto;

comparing the coordinate information with the stored coordinate information to identify coordinate information including the input coordinate information and determining a key code indicated by the input coordinate information; and determining one character code from the determined two key codes indicated by the start position and end position of a continuous single input.

22. A character input method according to claim 21, wherein the coordinate information is input using data input from a pen input device.

23. A character input method according to claim 21, wherein the coordinate information is input using data input from a pointing device.

24. A character input method according to claim 21, wherein a character pattern specified by the stored character information corresponding to the coordinate information is displayed at a position on a display specified by stored coordinate information.

25. A storage medium which contains a program for carrying out a character input method for displaying a keyboard on which a key picture surface is displayed, in which said method comprises the steps of:

detecting a designated key position based on input coordinates where a designated character key pattern is depicted on a displayed keyboard;

recognizing an input pattern which is superimposed on said designated key pattern depicted in the detected key position on said displayed keyboard and identifying a pattern having a similar shape to said input pattern from among a plurality of predetermined patterns having different shapes, respectively;

generating a specific code based on the detected designated key position and the identified input pattern; and inputting a pattern constituted by said specific code at a plurality of coordinates corresponding to those input on the display keyboard.

26. A storage medium according to claim 25 wherein said identifying step identifies a character depicted on the detected key position.

27. A storage medium according to claim 25 wherein said identifying step identifies a continuous designating output operation started from the detected key position, and identifies a key position where the continuous operation is terminated.

28. A storage medium according to claim 25 wherein the key position is designated using data input from a pen input device.

29. A storage medium according to claim 25 wherein the key position is designated using data input from a pointing device.

30. A storage medium according to claim 25, wherein said storage medium has stored therein display information relating to the keyboard.

* * * * *

UNITED STATES PATENT AND TRADEMARK OFFICE
CERTIFICATE OF CORRECTION

PATENT NO. : 6,107,994  
DATED : August 22, 2000  
INVENTOR(S) : Takashi Harada et al.

Page 1 of 1

It is certified that error appears in the above-identified patent and that said Letters Patent is hereby corrected as shown below:

Title page,
Item [22], line filed "Sep. 26, 1997" should read -- Sep. 25, 1997 --.

Item [63],
Related U.S. Application Data, "Continuation in part" should read -- Continuation --.

Signed and Sealed this

Twentieth Day of November, 2001

*Attest:*

*Nicholas P. Godici*

NICHOLAS P. GODICI
*Attesting Officer*  *Acting Director of the United States Patent and Trademark Office*